Feb. 14, 1961 J. G. VAN SANTEN ET AL 2,972,076

SOLID-STATE IMAGE INTENSIFIER

Filed Jan. 7, 1957 2 Sheets-Sheet 1

INVENTOR
JOHANNES GERRIT VAN SANTEN
GESINUS DIEMER

BY Frank R. Trifari
AGENT

INVENTOR
JOHANNES GERRIT VAN SANTEN
GESINUS DIEMER
BY Frank R. Jifari
AGENT 2,972,076
Patented Feb. 14, 1961

2,972,076

SOLID-STATE IMAGE INTENSIFIER

Johannes Gerrit van Santen and Gesinus Diemer, Eindhoven, Netherlands, assignors, by mesne assignments, to North American Philips Company, Inc., New York, N.Y., a corporation of Delaware Filed Jan. 7, 1957, Ser. No. 632,923

Claims priority, application Netherlands Feb. 14, 1956

14 Claims. (Cl. 313—108)

This invention relates to luminescent screens as solid-state image intensifiers, which comprise associated elements containing an electroluminesment material and a semi-conductive material respectively, the specific electrical impedance of the latter being adapted to be acted upon in a reversible manner by radiation (which latter material will be referred to hereinafter as the photo-sensitive material), and which comprise two electrodes for applying an electric voltage to the associated elements arranged in series, one electrode being associated with the elements containing the photo-sensitive material and the other electrode being associated with the elements containing the electroluminescent material. By means of such luminescent screens it is possible to intensify or make visible a primary radiation image projected on the photo-sensitive elements in that the variations in the impedance of the photo-sensitive material brought about by the primary radiation locally control the electric voltage across the electroluminescent material, and hence the electroluminescence thereof.

A solid-state image intensifier is known in which the photo-sensitive elements and the electroluminescent elements each constitute a separate layer. The grouping in associated elements of said layers is effected by arranging the two layers, if necessary with the interposition of an intermediate layer intercepting the electroluminescent light, in the direction of the thickness of the screen behind one another and composing the electrodes of conductive surfaces pervious to radiation, for example of tin oxide, on each side of the layer complex. It has been found that this construction is not particularly suitable in working with primary radiation in the visible spectrum. Since the conventional photo-sensitive materials such, for example, as cadmium sulphide, have a high absorption coefficient for the greater part of the visible spectral region, the thickness of the photo-sensitive layer in this case must not be more than several tens of microns, since otherwise the radiation to be used cannot penetrate said layer. However, such a small thickness of the photo-sensitive layer results in the ratio between the electrical impedances of a non-irradiated photo-sensitive element and of the associated electroluminescent element, which ratio must be high for a control over a wide range of the electroluminescence, assuming an unfavourably low value. The dark impedance of a photo-sensitive element is determined by the specific dark resistance of the photo-sensitive material and by the geometry of the element. The latter is decisive not only for the dark resistance, but also for the capacitance of the element, which becomes important when the luminescent screen is fed on alternating current. The above-mentioned small thickness of the photo-sensitive layer results in the capacitance of the layer becoming high and the dark resistance becoming low as compared with those of the electroluminescent layer, for which a thickness of from 25 to 100 microns is required.

The object of the invention is to provide a construction which permits of obtaining a favourable value for the above-mentioned impedance ratio without detracting from the sensitivity of the photo-sensitive elements to a primary radiation which is greatly absorbed by the photo-sensitive material. The construction according to the invention also permits of utilizing a photo-sensitive material having a comparatively low dark resistance.

The luminescent screen according to the invention is characterized in that the projections of the two electrodes associated with the photo-sensitive and with the electroluminescent elements respectively projected on a surface parallel to the luminescent screen constitute interlaced line or stripe patterns which do not intersect.

In one advantageous preferred embodiment of the luminescent screen according to the invention, similarly as in the known solid-state image intensifier as above described, the photo-sensitive material and the electroluminescent material are contained in separate continuous layers located behind one another in the direction of thickness of the screen, while the thickness of the photo-sensitive layer is less than that of the electroluminescent layer and the spacing between the edges of the adjacent parts of the two electrodes in the projection is larger than the thickness of the photo-sensitive layer and the electroluminescent layer together.

In another embodiment, the luminescent screen is built up from locally parallel paths located substantially in the same plane and containing alternately the photo-sensitive material and the electroluminescent material, the photo-sensitive paths and the electroluminescent paths each being provided with one of the electrodes which do not intersect in the projection. By the use of auxiliary electrode elements which in each case constitute a conductive junction between at least a portion of the edge of a photo-sensitive path and a portion of that surface of an adjacent electroluminescent path which is not provided with an electrode, it is possible to ensure that a part of a photo-sensitive path is electrically associated with a part of small area of one or both adjacent electroluminescent paths. These auxiliary electrode elements have the effect that photocurrents, which otherwise would enter the electroluminescence paths at restricted regions where the photo-sensitive material and the electroluminescent material abound, are caused to spread or diffuse slightly before entering the electroluminescent material. In accordance with the invention, the auxiliary electrode current-diffusing elements may consist of relatively insulated small surfaces of material of high electric conductivity, for example metal or conductive metal oxide, such as tin oxide. In view of the definition of the image, said surfaces in the direction of the paths must have a dimension which is not larger than that which is transverse thereto.

According to the invention, in another embodiment, the auxiliary electrode elements consist of a material having an electric conductivity which increases upon increasing voltage, for example conductive cadmium sulphide, with a binder, which auxiliary electrodes constitute paths extending in the direction of the paths containing the electroluminescent material and the photo-sensitive material.

In accordance with the invention, the thickness of the photo-sensitive elements is preferably not more than 50 microns and more particularly not more than from 10 to 20 microns.

In order that the invention may be more readily carried into effect, several embodiments will now be described, by way of example, with reference to the accompanying drawings, in which.

The various details are not shown in the correct proportion with respect to one another, the essential dimensions for the greater part being indicated in the description following hereinafter. More particularly the thickness of layers or paths, which is small in proportion to that of other layers, is shown on a greatly exaggerated scale for the sake of clarity.

Figure 1:
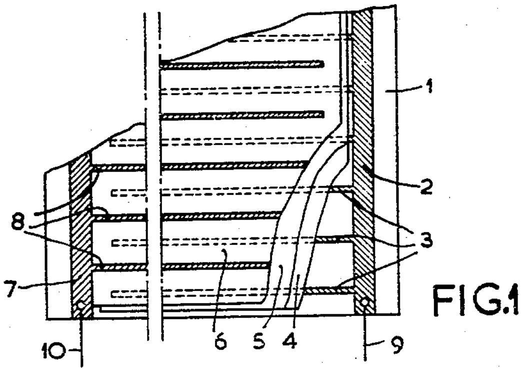
Fig. 1 shows diagrammatically a plan view of a first embodiment, in which several sequential layers have been removed in part.
Figure 2:
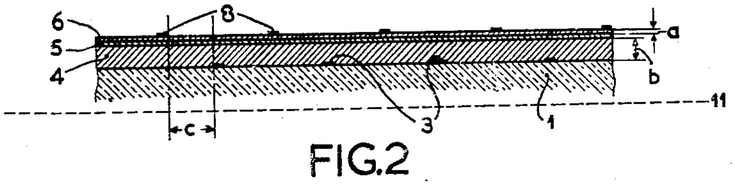
Fig. 2 shows diagrammatically part of a vertical cross-section of the luminescent screen of Fig. 1.

In the luminescent screen shown in Figures 1 and 2, a comb-like electrode 2, which consists of a thin layer of conductive tin oxide and is transparent, is provided on a transparent carrier 1 in the form of a glass plate. The electrode 2 has teeth 3, which extend parallel to one edge of the glass plate 1. The distance between the centres of the teeth is approximately 1 mm., each tooth having a width of about 100 microns. The teeth are covered with a layer 4 containing an electroluminescent material, if desired together with a binder, such as urea formaldehyde. The electroluminescent material may consist, for example, of zinc sulphide activated with copper and aluminum. The thickness *b* (see Fig. 2) of the layer 4 is about 100 microns.

The layer 4 has provided on it a thin opaque intermediate layer 5 having a high resistance in directions in its plane, which intermediate layer may consist of, for example, black lacquer. On the intermediate layer 5 there is provided a photo-sensitive layer 6 having a thickness *a* of about 10 microns and substantially consisting of a material, the specific electrical impedance of which may be varied in a reversible manner by irradiation. The layer 6 may consist of, for example, cadmium sulphide activated with copper and gallium. The layer 6 may be applied by evaporation of the photo-sensitive material in vacuo. In this case, it is preferable for the sequence of the layers 4, 5 and 6 to be reversed with respect to the transparent carrier.

On the photo-sensitive layer 6 there is provided a second comb-like electrode 7, the teeth 8 of which extend parallel to the teeth 3 of the electrode 2 and are located midway above the spacings therebetween. The projections of the electrodes 2 and 3 on a plane parallel to the luminescent screen as indicated by the dotted line 11 in Figure 2 do not intersect and are interlaced. The electrode 7, similarly as the electrode 2, may consist of an extremely thin layer of tin oxide, but alternatively use may be made of a metallic layer applied by evaporation in the pattern desired. The width of the teeth 8, as that of the teeth 3, is about 100 microns.

The spacing *c* (Fig. 2) between the adjacent edges of the teeth of the electrodes 2 and 7 projected on a surface parallel to the luminescent screen is about 400 microns in the example described. In accordance with the invention, this spacing is larger than the sum of the thicknesses of the photo-sensitive layer 6 and of the electroluminescent layer 4, which sum $(a+b)$ in this case is a little more than 100 microns.

The following can briefly be said about the operation of the luminescent screen shown in Figures 1 and 2.

When an electric voltage, preferably an alternating voltage, is applied to the luminescent screen by means of current supply wires 9 and 10 connected to the electrodes 2 and 7, the electric field strength in the electroluminescent layer 4 is locally dependent upon the local impedance of the superjacent photo-sensitive layer 6, since, when the layer 4 locally has a very high impedance, the field at this area extends substantially in a straight line from a tooth 3 to a tooth 8, whereas, if the photo-sensitive layer locally has a low impedance, for example due to radiation incident from above in Fig. 2, the greater part of the voltage is set up transversely to the electroluminescent layer. Consequently, a primary radiation image produced on the photo-sensitive layer 4 results in a corresponding electroluminescent image being produced in the layer 4, which can radiate its light through the transparent carrier 1.

Since the photo-sensitive layer is very thin and the spacing *c* is larger than the thickness *b* of the electroluminescent layer 4, the electric field strength in the electroluminescent layer is greatly different, if the photo-sensitive layer is not conductive and if it is made conductive by irradiation. Since the layer 8 is very thin, a photo-sensitive material having a comparatively low dark resistance may be used in this layer and the luminescent screen also reacts to radiation, for which the photo-sensitive material has a high absorption coefficient.

Figure 3:
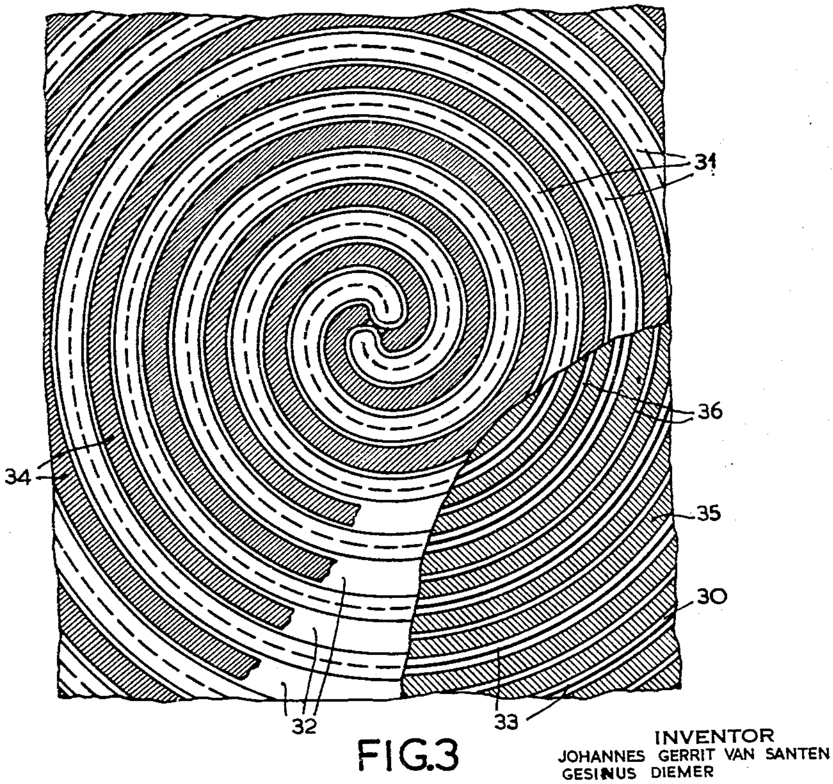
Fig. 3 is a plan view of the central portion of a second embodiment, in which likewise several layers have been broken away in part.
Figure 4:
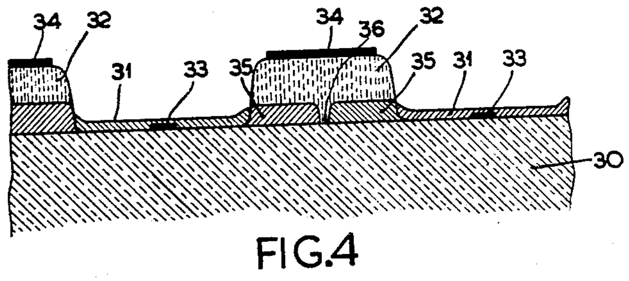
Fig. 4 shows a portion of a radial section of the luminescent screen of Fig. 3.

In the luminescent screen described with reference to Figures 3 and 4, locally parallel and laterally contiguous paths 31 and 32 having a width of about 0.5 mm. are provided on a carrier 30 in the form of a glass plate, which paths contain a photo-sensitive material, for example activated cadmium sulphide, and an electroluminescent material, respectively, for example activated zinc sulphide. The paths constitute concentric geometric spirals and contain alternately the photo-sensitive material and the electroluminescent material. Provided midway under each path 31 on the carrier 30 is a spiral-shaped electrode 33 of high conductivity, having a width of from 50 to 100 microns, if possible less, and consisting of a thin layer of tin oxide or metal. On the side remote from the carrier 30, the paths 32 containing the electroluminescent material are provided with a transparent electrode 34 of high conductivity, having a width a little less than that of the relative path 32. The projections of the electrodes 33 and 34 on a surface parallel to the luminescent screen are interlaced. The various electrode portions 34 are electrically through-connected at the outer ends of the spirals (not shown) and the same applies to the electrode portions 33.

Under each half of a path 32 containing the electroluminescent material there is provided a likewise spiral-shaped path 35, the outer edge of which adjoins the edge of the photo-sensitive path 31 adjacent the relative electroluminescent path. The paths 35, of which the two paths located under the same electroluminescent path are separated by a small spacing 36, consist of a material, the electrical conduction of which is dependent upon voltage, that is to say increases upon increasing electric voltage. Said paths may consist of for example, conductive cadmium sulphide with a binder such as an epoxy resin and may have a thickness of about 50 microns.

If an electric voltage is applied to the electrodes 33 and 34, the voltage between a path 35 and the electrode 34 provided on the opposite side of the relative electroluminescent path 32 is locally determined by the local impedance of the photo-sensitive path 31 to which the path 35 adjoins. Said impedance may be acted upon by radiation (primary radiation), to which the photo-sensitive material in the path 31 is sensitive. Such radiation may be caused to impinge through the transparent carrier 30 upon the surface of the photo-sensitive paths 31 which is adjacent the carrier and in such a case the absorption coefficient of the photo-sensitive material for this radiation is of little importance. If the primary radiation in Fig. 4 is caused to impinge from above upon the screen, thus striking the surface of the paths 31 which is remote from the electrode 33, it is necessary in order to obtain a distinctly noticeable effect that the thickness of a path 31 shall be sufficiently small to be penetrated by the primary radiation. Consequently, the paths 31 are preferably given a thickness not greater than 50 microns, while as a function of the manner in which the layers 31 are provided, a thickness of from 5 to 10 microns (application by evaporation) or from 10 to 20 microns (application by spraying) is very advantageous. The thickness of the paths 32 containing the electroluminescent material is about 100 microns. The paths 32 and 35 may be provided, for example, by a silk-screen method.

In the embodiment described with reference to Figures 3 and 4, the paths 31 and 32 and hence also the electrodes 34 and 33 and the auxiliary electrode paths 35 constitute concentric spirals. It will be evident that the paths and hence also the electrodes and the auxiliary electrode paths may extend in straight lines similarly as in the screen of Figures 1 and 2. However, it is not necessary for the paths to constitute straight lines, they may alternatively follow an undulated line or a zigzag line. The essential point is that the paths follow lines which have no points of intersection. The same also applies to each of the following examples. In view thereof, in the figures illustrating these examples, only a portion of a cross-section at right angles to the local direction of the electrodes to be connected to the voltage is shown.

Figure 5:
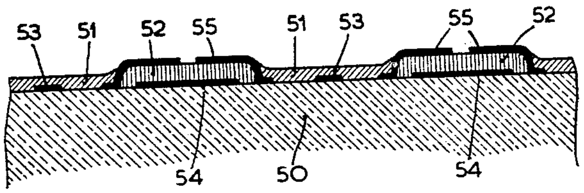
Fig. 5 shows diagrammatically a portion of a cross-section of a luminescent screen according to the invention, which is a variant of the embodiment shown in Figures 3 and 4.

Fig. 5 shows part of the cross-section of one embodiment which differs from the luminescent screen explained with reference to Figures 3 and 4 in the first instance in the positioning of the line electrode on the electroluminescent paths. This electrode, which is indicated by 54 in Fig. 5, is provided directly on a transparent carrier 50, similarly as the electrode 53 for the photo-sensitive paths, which carrier 50 may consist of a transparent synthetic material. The photo-sensitive material and the electroluminescent material are contained in locally parallel paths 51 and 52, respectively. In this embodiment also, auxiliary electrode elements indicated by 55 which are provided on the same side as the electrodes 53, are in contact with the photo-sensitive paths 51 and constitute an electric through-connection with that side of the electroluminescent paths 52 which is remote from the electrode 54. The auxiliary electrode elements, as is the case in the example shown in Figures 3 and 4, may consist of paths containing a voltage-sensitive material, which extend in the direction of the length of the paths 51 and 52. The auxiliary electrode elements may alternatively be constituted by conductive, relatively insulated small surfaces or islands 55, for example of metal or conductive metal oxide. In view of the definition of the image, said elements must, however, not be continuous in the direction of the paths 51 and 52 and hence of the electrodes 54 and 53, as is the case when use is made of a voltage-sensitive conductive material. Consequently, the dimension of the relatively insulated conductive surfaces of the auxiliary electrodes 55 is chosen in the direction of the paths 51 and 52 to be not larger than in the direction transverse thereto. The surfaces may, for example, be square in projection on a surface parallel to the luminescent screen.

Figure 6:
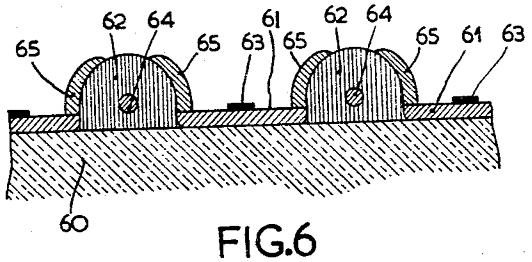
Fig. 6 shows diagrammatically part of the cross-section of another embodiment, and Fig. 7 at last shows part of the cross-section of again another embodiment.

Fig 6 shows diagrammatically part of a cross-section of a luminescent screen according to the invention, in which the screen, similarly as in the two preceding embodiments, is built up from locally parallel paths containing alternately the photo-sensitive and the electroluminescent material. The electrode associated with the electroluminescent material is constituted by a system of thin parallel metal wires 64, which are surrounded by an envelope 62 of electroluminescent material having a thickness of about 100 microns. The wires thus enveloped and bearing on a transparent carrier 60 are in each case separated by a photo-sensitive path 61 having a width of about 600 microns and a thickness of, for example, from 10 to 20 microns, which path 61 adjoins on each side an electroluminescent envelope 62.

An electrode 63 having a width of from 50 to 100 microns is arranged on each photo-sensitive path 61, at the centre thereof, on the side remote from the carrier 60. The edge of each photo-sensitive path and part of the periphery of the adjoining electroluminescent envelope 62 is provided, on the side of the electrode 63, with a series of auxiliary electrode elements 65. The auxiliary electrodes may consist of a voltage-sensitive material and in this case extend in the direction of the length of the paths 61. They may alternatively be constituted by conductive surfaces, a certain number of which are located behind one another in a relatively insulated manner in the direction of the paths 61, the dimension of each element in this direction being not larger than that transverse thereto.

Figure 7:
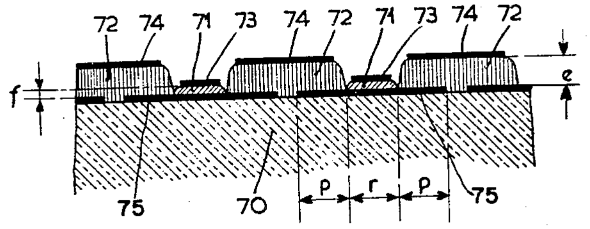

At last, Fig. 7 shows diagrammatically part of a cross-section of one embodiment in which the conduction in the photo-sensitive paths takes place in the direction of the thickness thereof. In order to obtain an advantageous value of the ratio between the impedances of the associated parts of the photo-sensitive and electroluminescent paths, provision is made of auxiliary electrode elements each associated with a surface of the electroluminescent material larger than the surface of the photo-sensitive material which is in contact therewith. Alternating paths 71 and 72, respectively, containing the photo-sensitive material and the electroluminescent material are arranged on a transparent carrier 70. The thickness of the paths 71 is small, for example from 10 to 20 microns, so that these paths are pervious to the primary radiation to be used. The thickness of the electroluminescent paths 72 is about 100 microns. Electrodes 73 and 74, respectively, which may be connected to the line voltage, are provided on the paths 71 and 72, respectively. Under each photo-sensitive path 71 having a width $r$ and a thickness $f$ there is arranged on the carrier 70 an auxiliary electrode element 75 which extends on each side thereof through a width $p$ under the adjacent electroluminescent paths 72 having a thickness $e$. The auxiliary electrode elements 75 may be constituted by thin strips of conductive, voltage-dependent material extending in the direction of the paths 71 and 72; they may alternatively be constituted by more or less square surfaces, if possible transparent, of metal or a conductive metal oxide. The effect envisaged by the invention is obtained if the width $p$ satisfies the equation $\epsilon_f.r/f<2\epsilon_e.p/e$, wherein $\epsilon_f$ and $\epsilon_e$ represent the dielectric constants of the material of a photo-sensitive path 71 and of an electroluminescent path 72, respectively.

What is claimed is:

1. A radiation-sensitive device comprising a variable-impedance, photo-sensitive element and an electroluminescent element adjacent one another, and a pair of electrodes for applying an electric voltage to the adjacent variable-impedance and electroluminescent elements, one of said electrodes contacting the variable-impedance element, the other of said electrodes contacting the electroluminescent element, said electrodes being positioned such that their projections onto a surface parallel to the device are spaced from one another.

2. A radiation-sensitive device comprising a thin variable-impedance, photo-sensitive layer and a thicker electroluminescent layer adjacent one another, and a pair of electrodes for applying an electric voltage to the adjacent variable-impedance and electroluminescent elemental areas of the layers in series, said electrodes each comprising a plurality of elongated, interconnected, periodically-arranged conductive portions, the conductive portions of one of said electrodes contacting only the variable-impedance elemental areas, the conductive portions of the other of said electrodes contacting only the electroluminescent element areas, said electrodes being positioned such that the projections of their conductive portions onto a surface parallel to the device are spaced from one another.

3. A device as set forth in claim 2 wherein the photo-sensitive element has a thickness of less than 50 microns, and the electrodes are comb-like in form.

4. A device as set forth in claim 3 wherein the photo-sensitive element is produced by vaporization.

5. A device as set forth in claim 2 wherein the electrodes are concentrically-spirally shaped.

6. A radiation-sensitive device comprising a support, a first electrode comprising a plurality of interconnected conductive portions of said support, a thick continuous layer of electroluminescent material on said first electrode, a thin continuous layer of variable-impedance, photo-sensitive material juxtaposed to and overlying said electroluminescent layer, and a second electrode comprising a plurality of interconnected conductive portions on said variable-impedance layer, the conductive portions of said first and second electrodes being positioned such that their projections onto a surface parallel to the layers are spaced from one another by a distance greater than the combined thickness of the variable-impedance and electroluminescent layers, the thickness of the variable-impedance layer being much smaller than that of the electroluminescent layer.

7. A radiation-sensitive device comprising a plurality of variable-impedance, photo-sensitive elements and a plurality of electroluminescent elements arranged in alternating sequence and adjacent one another and substantially coplanar, and a pair of electrodes for applying an electric voltage to the adjacent variable-impedance and electroluminescent elements in series, one of said electrodes comprising a plurality of conductive portions each contacting one of the variable-impedance elements only, the other of said electrodes comprising a plurality of conductive portions each contacting one of the electroluminescent elements only, said electrodes being positioned such that the projections of their conductive portions onto a surface parallel to the coplanar elements are spaced from one another.

8. A device as set forth in claim 7 wherein the electrode contacting the electroluminescent material comprises a plurality of thin wires surrounded by the electroluminescent material, the photo-sensitive elements comprise layers extending between and laterally contacting the electroluminescent material, and the other electrode contacts the center of the photo-sensitive layers.

9. A device as set forth in claim 8 wherein current-diffusing auxiliary electrodes are provided contacting adjacent portions of the electroluminescent material and the photo-sensitive layer.

10. A device as set forth in claim 7 wherein both electrodes contact the same sides of the photo-sensitive and electroluminescent elements, the photo-sensitive elements have a smaller width than the electroluminescent elements, and a plurality of current-diffusing auxiliary electrode elements are provided contacting the opposite sides of both the photo-sensitive and electroluminescent elements, the capacitance associated with the auxiliary electrode and the photo-sensitive elements being less than that associated with the auxiliary electrode and the electroluminescent elements.

11. A radiation-sensitive device comprising a plurality of thin variable-impedance, photo-sensitive elements and a plurality of thicker electroluminescent elements arranged in alternating sequence and adjacent one another and substantially coplanar, a pair of electrodes for applying an electric voltage to the adjacent variable-impedance and electroluminescent elements in series, one of said electrodes comprising a plurality of conductive portions each contacting one of the variable-impedance elements only over only a part of the surface, the other of said electrodes comprising a plurality of conductive portions each contacting one of the electroluminescent elements only, said electrodes being positioned such that the projections of their conductive portions onto a surface parallel to the device are spaced from one another, and a plurality of current-diffusing auxiliary electrodes each contacting adjacent surfaces of each of the photo-sensitive and electroluminescent elements.

12. A device as claimed in claim 11 wherein the auxiliary electrodes contact the same side of the photo-sensitive elements contacted by their associated electrode.

13. A device as claimed in claim 11 wherein the auxiliary electrodes comprise small, highly-conductive islands having relatively small thickness compared to their length and width.

14. A device as claimed in claim 11 wherein the auxiliary electrodes comprise a material whose conductivity increases as the voltage across it increases.

References Cited in the file of this patent

UNITED STATES PATENTS

| | | |
|---|---|---|
| 2,684,450 | Mager | July 20, 1954 |
| 2,748,304 | Botden | May 29, 1956 |
| 2,768,310 | Kazan | Oct. 23, 1956 |
| 2,792,447 | Kazan | May 14, 1957 |